No. 677,534. Patented July 2, 1901.
H. G. BLANCHARD.
ATTACHMENT FOR SHINGLE SAWING MACHINES.
(Application filed Dec. 3, 1900.)
(No Model.) 2 Sheets—Sheet 1.
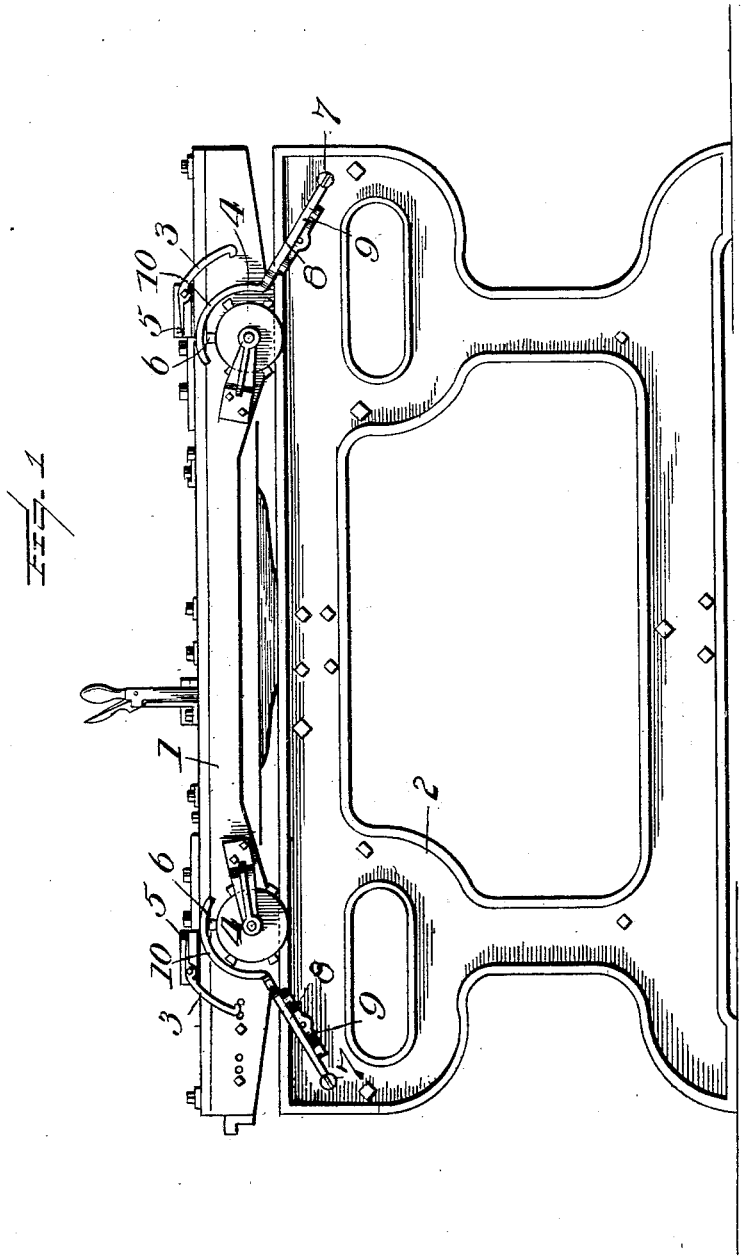
WITNESSES:
L. C. Hills
S. D. Bradley
INVENTOR
H. G. Blanchard,
BY W. A. Roberts
Attorney No. 677,534. Patented July 2, 1901.
H. G. BLANCHARD.
ATTACHMENT FOR SHINGLE SAWING MACHINES.
(Application filed Dec. 3, 1900.)
(No Model.) 2 Sheets—Sheet 2.
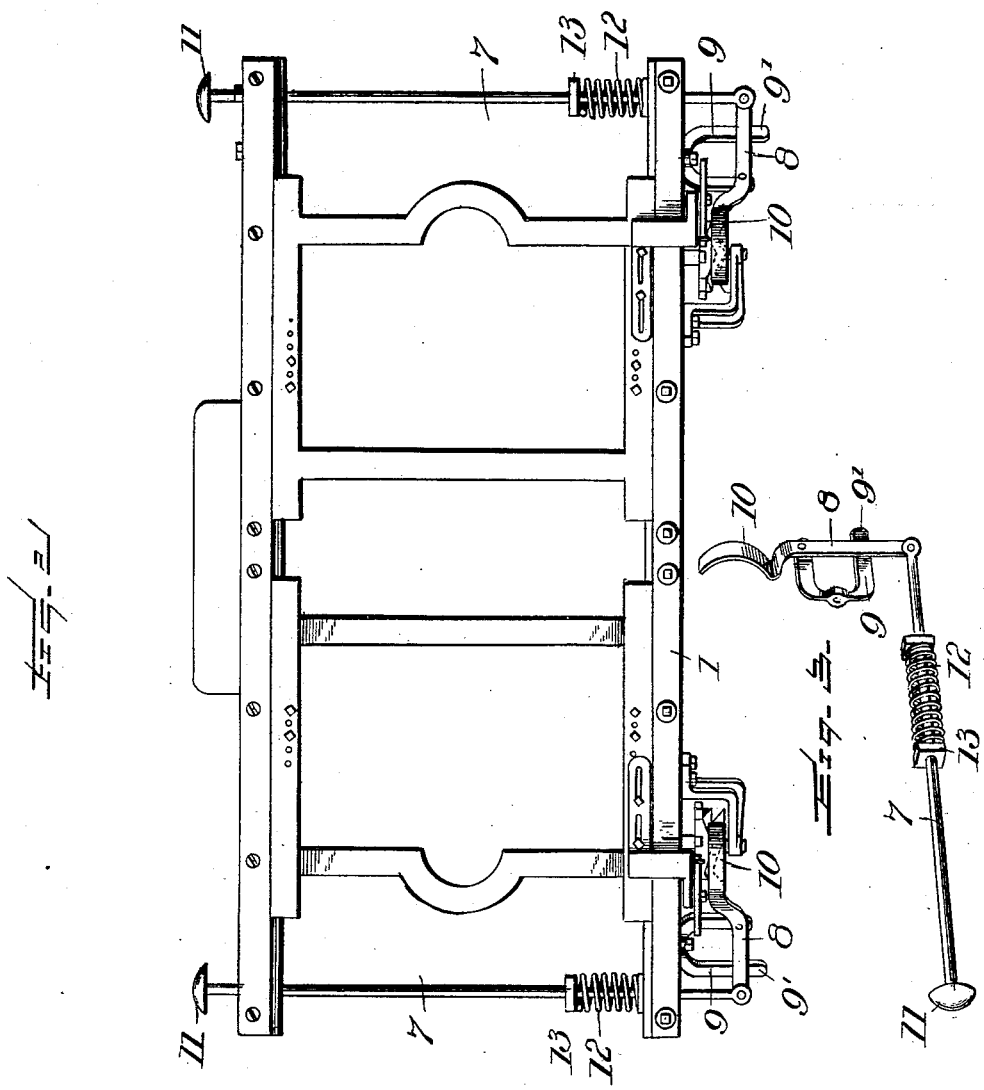
WITNESSES:
L. C. Hills
L. D. Bradley
INVENTOR
H. G. Blanchard.
BY W. A. Roberts
Attorney

UNITED STATES PATENT OFFICE.

HARRY GILES BLANCHARD, OF BAY, ARKANSAS.

ATTACHMENT FOR SHINGLE-SAWING MACHINES.

SPECIFICATION forming part of Letters Patent No. 677,534, dated July 2, 1901.

Application filed December 3, 1900. Serial No. 38,476. (No model.)

*To all whom it may concern:*

Be it known that I, HARRY GILES BLANCHARD, a citizen of the United States, residing at Bay, in the county of Craighead and State of Arkansas, have invented certain new and useful Improvements in Attachments for Shingle-Sawing Machines; and I do hereby declare the following to be a full, clear, and exact description of the invention, such as will enable others skilled in the art to which it appertains to make and use the same.

My invention has relation to attachments for shingle-sawing machines; and it consists in the novel arrangement and construction of its parts, as hereinafter described.

My present invention is an improvement on the machine patented by Frank Challonder, dated May 11, 1897, No. 582,601. In the said patent it will be observed that a means is provided for automatically changing the inclination of the tilt-table, so as to cut the butts and points alternately from opposite ends of the shingle-bolts. The machine is provided at each end adjacent to one of the carriage-ways with a cam having a zigzag groove in its periphery and teeth at intervals corresponding with the turns in the cam-groove. Each carriage is provided with a gravitating hook adjustably attached to the side of the carriage adjacent to the said cam. Each time the carriage advances its hook engages one of the teeth and turns the adjacent cam an interval, thus acting through suitable connections to shift the tilt-table so that when the carriage returns and the shingle-bolt therein is dropped upon the tilt-table its inclination will be reversed and the butt-end of the next shingle will be taken from the opposite end of the shingle-bolt. In the machine as shown in the patent referred to, to prevent the alternate change in either tilt-table for the purpose of "graining" a shingle-bolt, a cross-shaft is provided at each end of the machine, each shaft having at one end an arm which is arranged to engage with a tooth on the said cam and turn the latter backward sufficiently to cause the hook on the adjacent carriage to clear the tooth which would otherwise engage it for reversing the inclination of the tilt-table. My present invention is a substitution for the said cross-shaft and its attachments.

In the accompanying drawings, Figure 1 is a side elevation of the framework of a shingle-sawing machine with my invention attached thereto. Fig. 2 is a top plan view of the same, and Fig. 3 is a perspective view of the attachment.

The carriage 1 is arranged upon the framework 2. Said carriage is provided with a gravity-hook 3, pivoted to the side thereof adjacent to the cam 4 and provided with a pin 5, against which the projection of the hook 3 strikes, thus limiting the downward movement of the hook. Each time the carriage advances its hooks 3 3 engage one of the teeth 6, and thus turn the adjacent cam an interval. This, acting through suitable connections, (not shown in the drawings,) shifts tilt-table, (not shown,) so that when the carriage returns and the shingle-bolt (not shown) is dropped upon said tilt-table the inclination of the shingle-bolt will be reversed and the butt-end of the next shingle will be taken from the opposite end of the shingle-bolt. In the backward movement each hook 3 rides loosely over the teeth of the adjacent cam without turning the same.

To prevent the alternate change in the inclination of either tilt-table for the purpose of graining a shingle-bolt, I provide at the end of the machine a cross-rod 7, which is pivoted at one end to the outer end of the lever 8, said lever being fulcrumed to one end of the U-shaped iron 9, which in turn is bolted to the side of the framework of the machine, the longer end 9' of said iron extending under said lever and forming a rest or guide therefor. The free end of the lever 8 is curved, as at 10, the arc described being sufficient to permit said curved end to pass over the periphery of the cam 4 and its teeth, as shown in Fig. 1, thus housing the said cam and teeth and preventing the hook 3 from engaging the teeth. Thus the tilt-table above referred to will not be operated when the curved end of the lever is interposed between the cam-teeth and the said hook. The free end of the rod 7 is provided with a knob 11, against which the operator presses to move said rod and operate the lever 8. A coil-spring 12 is interposed between the framework of the carriage and a collar 13, attached to said rod, said spring being adapted to bring the parts back to their normal position when the operator removes the pressure from the knob 11 of the rod 7.

Having described my invention, what I claim as new, and desire to secure by Letters Patent, is—

1. In combination with a shingle-sawing machine having a toothed wheel and pivoted hook for operating the same, an attachment consisting of a lever fulcrumed to the machine and having a curved end swinging into and out of the plane of the wheel and thus adapted to be interposed between the wheel and the hook and a suitable means for operating said lever.

2. In combination with a shingle-sawing machine having a toothed cam and a hook for operating the same, a lever fulcrumed to one end of a U-shaped iron, said U-shaped iron attached to the machine, the opposite end of said iron being elongated passing under the lever and forming a guide for the same, the free end of the said lever adapted to be interposed between the wheel and the hook, and a means for operating the lever.

In testimony whereof I affix my signature in presence of two witnesses.

HARRY GILES BLANCHARD.

Witnesses:
J. T. TINER,
J. S. ELDER.